United States Patent

Barth et al.

[11] Patent Number: 6,079,740
[45] Date of Patent: *Jun. 27, 2000

[54] GAS GENERATOR

[75] Inventors: Thomas Barth, München; Achim Hofmann, Polling; Markus Leifheit, Mühldorf; Josef Werneth, Ampfing; Anja Esau, Mühldorf, all of Germany

[73] Assignee: TRW Airbag Systems GmbH & Co. KG, Ashcau am Inn, Germany

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/089,561

[22] Filed: Jun. 3, 1998

[30] Foreign Application Priority Data

Jun. 3, 1997 [DE] Germany .............. 197 23 260

[51] Int. Cl.[7] .................................................. B60R 21/26
[52] U.S. Cl. .................... 280/737; 280/741; 102/530
[58] Field of Search ..................... 280/741, 742, 280/736, 737; 102/530, 531; 422/164

[56] References Cited

U.S. PATENT DOCUMENTS

| 3,901,530 | 8/1975 | Radke . | |
|---|---|---|---|
| 5,217,697 | 6/1993 | Kanazawa et al. | 422/165 |
| 5,423,570 | 6/1995 | Kort et al. | 280/736 |
| 5,468,015 | 11/1995 | Goetz | 280/737 |
| 5,558,366 | 9/1996 | Fogle, Jr. et al. . | |
| 5,601,308 | 2/1997 | Cuevas | 280/736 |
| 5,670,738 | 9/1997 | Storey et al. | 102/530 |
| 5,957,492 | 9/1999 | Hofbauer et al. | 280/737 |

FOREIGN PATENT DOCUMENTS

| 0741064 | 11/1996 | European Pat. Off. . |
|---|---|---|
| 2150744 | 5/1983 | Germany . |

Primary Examiner—Peter C. English
Assistant Examiner—Lynda Jasmin
Attorney, Agent, or Firm—Tarolli, Sundheim, Covell, Tummino & Szabo L.L.P.

[57] ABSTRACT

A gas generator, in particular for vehicle occupant restraint systems, with at least one combustion chamber containing propellant, and with at least one igniter arranged close to the propellant, for igniting the propellant is characterized in that the combustion chamber is separated from the igniter by an expansion chamber surrounding the igniter and provided for the gas developing on deflagration of the ignition material.

20 Claims, 2 Drawing Sheets

GAS GENERATOR

TECHNICAL FIELD

The invention relates to a gas generator, in particular for vehicle occupant restraint systems.

BACKGROUND OF THE INVENTION

In hitherto usual gas generators, the igniter, generally covered by an ignition cap surrounding the ignition material, immediately adjoins the propellant which is to be ignited, which is arranged in the combustion chamber. Therefore, the igniter extends into the combustion chamber. For that the gas generator releases gas as quickly as possible, the propellant must be ignited quickly and uniformly. Therefore, for example, booster charges are provided adjoining the igniter, which intensify the ignition effect. On deflagration of the ignition material and, if present, also of the booster material, a blast wave is produced which can partially destroy the propellant tablets, which is disadvantageous for deflagration behaviour and also for the predeterminability of the gas pressure distribution.

BRIEF SUMMARY OF THE INVENTION

The invention provides a gas generator which is distinguished by a short delay time up to the deflagration of the propellant and also by a deflagration behaviour which is able to be predetermined within close limits. The pressure distribution inside a gas bag, which is able to be achieved by the gas generator, can therefore be kept within desired close limits. The gas generator according to the invention comprises a housing having an outer wall, at least one outflow opening in the outer wall for an outlet of generated gas, at least one combustion chamber containing propellant, and at least one igniter arranged close to the propellant for igniting the propellant. The igniter comprises an igniting material. The gas generator further has an expansion chamber surrounding the igniter for the generated gas developing on deflagration of the ignition material. The expansion chamber separates the combustion chamber from the igniter.

Thereby, the gases developing on deflagration of the ignition material and the hot particles can spread out in the expansion chamber within a very short period of time and flow in a uniformly distributed manner into the combustion chamber, where they lead to a quicker deflagration of the entire propellant. A possibly irregular deflagration of the ignition material and igniting of the propellant is balanced out by the expansion chamber.

In addition, by the provision of the expansion chamber, a defined distance is provided between the propellant and the igniter, which facilitates the reproducibility of the ignition behaviour. The hot gases and particles developing on deflagration of the ignition material are distributed over a large surface when they flow into the combustion chamber via the expansion chamber, which improves the ignition behaviour.

Preferably, the expansion chamber and the combustion chamber are separated from each other by a diffuser having at least one passage opening, more advantageously several openings distributed uniformly over the circumference, the gas developing on deflagration of the ignition material reaching the combustion chamber via the passage openings. The diffuser, therefore, forms a kind of protection from the blast wave developing on deflagration of the ignition material, which can reach the combustion chamber only via the passage openings. Therefore, the destruction of the propellant tablets by the blast wave is largely avoided. In addition, by variation of the shape, the position and the number of the passage openings in the diffuser, the ignition behaviour, which hitherto was variable with difficulty, can be controlled in a simple way.

The combustion chamber surrounds the expansion chamber preferably annularly.

With the preferred embodiment, the diffuser is constructed as a cap and is put over the igniter and is axially and radially spaced therefrom.

In addition, the housing advantageously has an outflow opening and the diffuser is open towards the outflow opening. Therefore, a portion of the produced compressed gas and of the blast wave can move directly towards the outflow opening, which is closed before activation of the gas generator, in order for example to open the outflow opening or to support its being opening.

According to a further development, the housing has a housing base with a filling opening for the propellant, which facilitates filling. The filling opening is closed by a base plate in which the igniter is secured in a gas- and pressure-tight manner. The base plate and the igniter, therefore, form a pre-assembled unit.

An electrically insulating body which extends between the base plate, secured to the housing base by welding, and the end of the diffuser on the base side, and also extends into the combustion chamber, prevents a welding current from being able to flow over the diffuser during the welding-on of the base plate, which preferably is done by means of electric discharge welding. The welding current can thereby only flow between the base plate and the housing base.

The electrically insulating body, when it is constructed elastically, has the further function of fixing in position the propellant which is preferably present in tablet form. The fixing of the propellant in position is also facilitated in that the combustion chamber is closed, except for a few openings in the walls delimiting it.

In the preferred embodiment of the gas generator, the latter is a hybrid gas generator. The combustion chamber is surrounded by a pressure chamber containing compressed gas. A mixing chamber, separated from the combustion chamber by an intermediate base, serves for the mixing of the gas developing on deflagration of the ignition material and of the propellant, with the compressed gas.

The gases are such selected that, when they are mixed, a chemical reaction occurs in the form of a so-called afterburning of the hot gas.

DETAILED DESCRIPTION OF THE DRAWINGS

Figure 1:
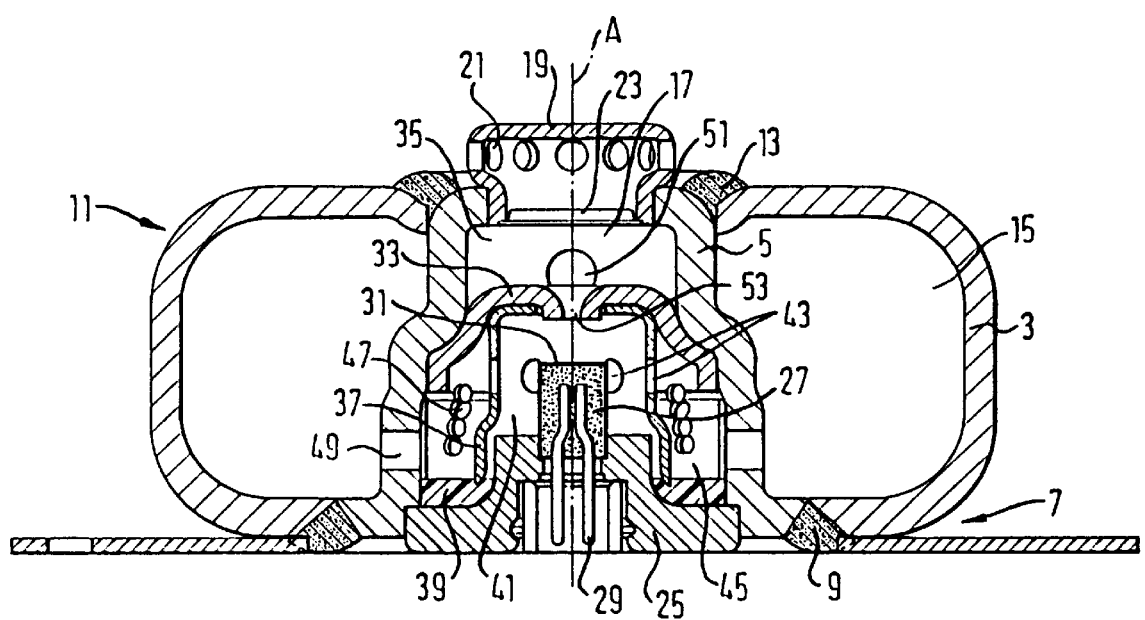
Figure 3:
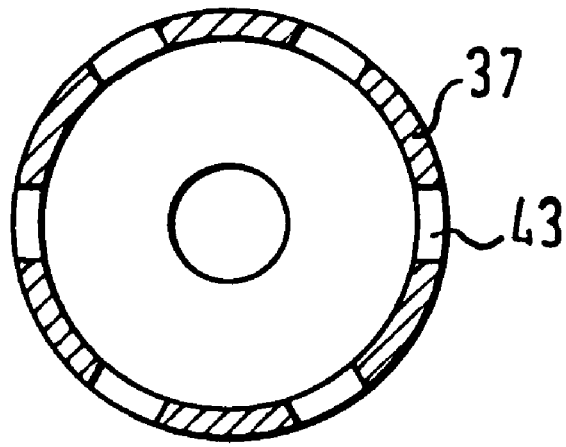
Figure 2:
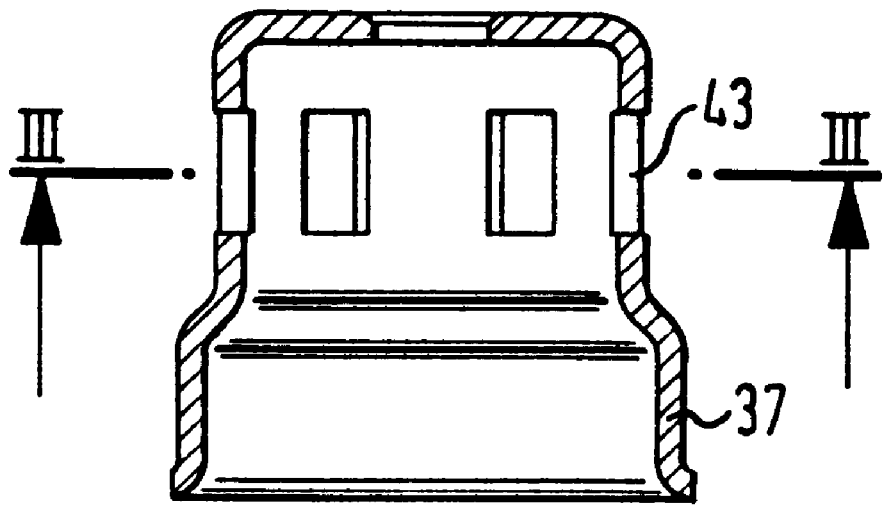

FIG. 1 shows a longitudinal sectional view through a first embodiment of the gas generator according to the invention, which is constructed as a hybrid ring gas generator, FIG. 2 shows an enlarged longitudinal sectional view of the diffuser shown in FIG. 1, defining the expansion chamber, and FIG. 3 shows a cross-sectional view according to line III—III in FIG. 2.

DETAILED DESCRIPTION OF A PREFERRED EMBODIMENT

In FIG. 1 a gas generator for a vehicle occupant restraint system is shown, which is constructed as a hybrid ring gas generator and serves for the inflation of a driver's gas bag. The gas generator is constructed so as to be substantially rotationally symmetrical to the central axis A. The housing of the gas generator has an outer wall 3 and an inner wall 5 spaced radially apart therefrom. The outer and the inner walls 3 and 5, respectively, are connected with each other in a gas- and pressure-tight manner at the end 7 on the base side by means of a weld seam 9 and also at the opposite end 11 on the front side by means of a further weld seam 13. The inner wall 5 is also designated as a tension rod. A pressure chamber 15, which is filled with compressed gas, is formed between the outer and the inner walls 3 and 5, respectively. The inner wall 5 separates the pressure chamber 15 from a radially inner space, which is delimited radially by the inner wall 5. This space is divided into individual chambers. At the front end 11, the housing has the single outflow opening 17 for produced gas, which opening 17 is closed in the non-activated state in a gas- and pressure-tight manner by a cap-like closure element. The cap-like closure element comprises a diffuser 19 which is neutral with respect to thrust, with radial bores 21, and also comprises a bursting disc 23 closing the flow channel inside the diffuser 19 and welded to the end wall of the diffuser 19 facing the interior of the gas generator.

The central space, delimited by the inner wall 5, is closed towards the end 7 on the base side by a base plate 25. The base plate 25 is secured to the remaining housing by electrical discharge welding. An electric igniter 27 is installed in the base plate 25 in a gas- and pressure-tight manner, preferably by welding, and forms with this base plate 25 a pre-assembled unit. The igniter comprises a primary charge arranged around the ignition wire, and also comprises a secondary charge surrounding the primary charge. The charges are surrounded by an ignition cap 31, which is welded to the base plate 25.

A cap-like intermediate base 33 divides the space delimited to the exterior by the inner wall 5, into two spaces which are separated from each other in a gas-tight manner, namely an upper space which represents a mixing chamber 35, and a lower space. This diffuser which is designated hereinbelow as an igniter diffuser in order to differentiate it from the diffuser 19, has a central opening on its upper end wall by which it rests in a gas- and pressure-tight manner against the intermediate base 33. The igniter diffuser 37 is fixed in position on the intermediate base 33 radially by means of corresponding fits on its outer side or in its opening. At the end of the igniter diffuser 37 on the base side, this igniter diffuser 37 rests on a disc-shaped body 39 made of electrically insulating elastic material. The body 39, in turn, lies on the base plate 25.

The igniter diffuser 37 divides the lower space into a radially inner expansion chamber 41 and a combustion chamber 45 surrounding the latter, which chamber 45 is in flow connection with the expansion chamber 41 via several radial passage openings 43 in the igniter diffuser 37 continuously distributed in the circumferential direction. The igniter 27, which is spaced apart from the igniter diffuser in radial and axial direction, projects into the expansion chamber 41.

The combustion chamber 45 is filled with propellant 47 in tablet form and has no direct communication with the mixing chamber 35. Several radial openings 49 in the inner wall 5 provide a flow connection between the combustion chamber 45 and the pressure chamber 15. Further openings 51, only one of which is shown, in the inner wall 5 finally provide a flow connection between the pressure chamber 15 and the mixing chamber 35. Via a centrally arranged passage opening 53 in the intermediate base 33, the mixing chamber 35 is in turn connected with the expansion chamber 41.

The filling of the gas generator proceeds as follows: Firstly, the propellant 47 is filled into the combustion chamber 45 via the filling opening which is present when the base plate 25 is not present. Then the unit consisting of base plate 25 with igniter 27 and body 39 is placed on and the filling opening is closed. The combustion chamber is closed except for the openings 49 in the inner wall 5 and in the igniter diffuser 37, so that, in particular also because of the elastic body 39, the filling of propellant in tablet form is fixed in its position. Then the base plate 25 is secured to the housing in a gas- and pressure-tight manner by electrical discharge welding. The body 39 of electrically insulating material here prevents a short-circuit current from being able to flow via the igniter diffuser 37.

Then the gas generator is filled with compressed gas via the outflow opening 17, now serving as filling opening for compressed gas. During the filling process, the unit consisting of diffuser 19 and bursting disc 23 is arranged close to the filling opening and has compressed gas flowing around it. The compressed gas spreads in the entire interior of the gas generator, i.e. in the mixing chamber 35, in the expansion chamber 41, in the combustion chamber 45 and in particular in the annular pressure chamber 15 taking up the greatest volume, so that inside the gas generator a uniform high pressure prevails. Also the igniter 27 is thereby under pressure load. Then the diffuser 19 is inserted into the filling opening 17 at the end 11 on the end face and is fastened in a gas- and pressure-tight manner on the housing by capacitor discharge welding. In the assembled state, the diffuser 19 protrudes axially over the housing.

In the case of an accident, the igniter 27 is activated by means of a triggering system —not shown—, so that the primary and the secondary charge deflagrate and produce gas. Moreover, on deflagration of the charges, hot particles are also produced. The ignition cap 31 is constructed such that its end wall which faces the bursting disc 23, opens first and hot gases and particles enter into the expansion chamber 41 at high speed, accompanied by a blast wave. The hot gases expand uniformly in the expansion chamber 41 and are distributed therein. Since, as stated, the front wall opens first owing to star-shaped impressions provided therein, a spreading results in particular in axial direction, so that the hot gases and hot particles together with the blast wave also partially move through the passage opening 53 diverging towards the mixing chamber, without previously having lost a partial amount of their energy by impact onto a wall or other parts, and strike directly onto the bursting disc 23. The distance of the bursting disc 23 from the igniter 27 and also its physical and chemical characteristics as well as the position and the size of the passage opening 51 are adapted to each other such that the hot gases and the hot particles in combined action with the blast wave destroy the bursting disc 23. In fact, on production of the hot gas by the deflagration of the ignition material, there will also occur secondary reactions with the compressed gas situated in the mixing chamber 35 and the expansion chamber 41, however, this is of minor importance for the destruction of the bursting disc, so that its destruction is practically exclusively effected by the deflagration of the ignition material. Due to this construction, a quick opening of the housing is possible, so that the pressures inside the gas generator, which are produced in the subsequently occurring reactions, can be kept relatively low. According to the adaptation of ignition material and bursting disc 23, the latter, if desired, can be destroyed solely by the hot particles in combination with the blast wave arising on deflagration of the ignition material, or only by the striking hot gases in combination with the blast wave.

The gas reaches the flow channel within the diffuser 19 constructed in one piece, via the opened outflow opening 17, is deflected in this diffuser 19 and leaves the gas generator via the numerous bores 21, without a thrust being thereby produced, and flows into the gas bag.

The hot gases and particles not flowing out via the passage opening 53 distribute, as already mentioned, uniformly in the expansion chamber 31, where they are partially reflected by the wall of the igniter diffuser 37 surrounding them. Via the numerous radial passage openings 43, the gases and hot particles enter into the combustion chamber 45, where they ignite the propellant 47. By means of the igniter diffuser 37, the blast wave spreading inside the expansion chamber 41 is also prevented from propagating unimpeded towards the combustion chamber 45 and from causing destruction of the propellant tablets there. After ignition of the propellant 47, the developing hot gas will flow via the openings 49 into the pressure chamber 15, and also via the passage openings 43 partially back into the expansion chamber and therefrom, via the passage opening 53, into the mixing chamber. The hot gas and the compressed gas are usually selected such that on mixing a chemical reaction takes place in the form of an afterburning of the hot gas. For this reason, a best possible mixing of the hot gas with the compressed gas is desired. In addition, this mixing also effects as homogeneous a cooling of the hot gases as possible. So that the mixing of the gases flowing into the pressure chamber 15 is facilitated, the openings 49 are preferably not exactly radially aligned. Rather, the central axes of the openings 49 extend, as viewed axially, obliquely to the radial direction, whereby turbulences are formed moving in circumferential direction. In addition, for enhanced turbulence, also a ring having oblique guide faces can be additionally provided around the outer side of the inner wall 5 in the region of the openings 49. The resulting gas mixture, which partially has a secondary reaction in the pressure chamber 15, flows via the openings 51 into the mixing chamber. Thus, the hot gas flowing into the mixing chamber via the passage opening 53 can additionally react with the compressed gas.

The embodiment of the gas generator is distinguished by a simple construction which for example does away with a booster charge or a separate igniter for the destruction of the bursting disc 23.

Due to the fact that the destruction of the bursting disc 23 is effected practically exclusively by means of the deflagration of the ignition material and hence very quickly, it is possible to open the bursting disc 23 approximately at the same time as the ignition of the propellant 47. Owing to the rapid opening of the gas generator, only a relatively small overpressure occurs in the gas generator itself, which reduces the material load and allows to construct all the walls so as to be relatively thin, resulting in advantages in terms of weight and cost.

The provision of the igniter diffuser 37 in connection with the expansion chamber provides the following advantages:
a) The hot gases and particles produced on deflagration of the ignition material can distribute themselves uniformly.
b) The distance between the propellant 37 and the igniter 27 is defined exactly and the hot gases and particles can distribute themselves over a larger surface and can then flow into the combustion chamber, whereby a better ignition behaviour can be achieved.
c) The ignition behaviour can be easily controlled by the size and the position of the passage openings 43.
d) The blast wave developing on deflagration of the ignition material, which partially strikes the igniter diffuser 37, leads to practically no more destruction of the propellant tablets. The body 39 for fixing the propellant 47 can be easily fixed by means of the igniter diffuser 37. Through the igniter diffuser 37, the combustion chamber 45 is separated spatially from the space which is to be kept free for the igniter, so that the filling is facilitated. Hitherto, this was made difficult by the igniter directly adjoining the propellant.
f) Through the fact that the igniter 37 also does not directly adjoin another part axially, the ignition cap 31 can open quickly in the direction of the bursting membrane. This rapid opening is particularly important in the gas generator which is shown, because the igniter is used directly to open the outflow opening 17. The diffuser therefore delimits an expansion chamber which also keeps free the path of the hot gases and hot particles in the direction of the bursting sheet on deflagration of the ignition material.

In FIGS. 2 and 3, the igniter diffuser 37, which has a cap-like shape and is put over the igniter 27, is shown in further detail. The radial passage openings 43, lying diametrically opposite each other in pairs, can be ring-shaped or, as shown in FIG. 2, can also be rectangular.

What is claimed is:
1. A hybrid gas generator for vehicle occupant restraint systems, comprising:

a housing having an outer wall;

at least one outflow opening in said outer wall for the outlet of generated gas;

at least one combustion chamber containing propellant, present in tablet form;

at least one igniter arranged close to said propellant for igniting said propellant;

said igniter comprising an ignition material; and an expansion chamber for said generated gas developing on deflagration of said ignition material, which expansion chamber immediately adjoins said igniter in a circumferential direction and a pressure chamber containing stored compressed gas in the non-activated state of said gas generator;

said expansion chamber separating said combustion chamber from said igniter; and said combustion chamber with said propellant being open with respect to the expansion chamber and said pressure chamber in said non-activated state of said gas generator.

2. The gas generator according to claim 1, wherein said combustion chamber annularly surrounds said expansion chamber.

3. The gas generator according to claim 1, wherein said expansion chamber and said combustion chamber are separated from each other by a diffuser having at least one compressed gas opening, said gas developing on deflagration of said ignition material reaching said combustion chamber via said compressed gas opening, said compressed gas opening being open even in said non-activated state of said gas generator.

4. The gas generator according to claim 3, wherein said diffuser is constructed as a cap and is put over said igniter.

5. The gas generator according to claim 3, wherein said diffuser is radially and axially spaced from said igniter.

6. The gas generator according to claim 1, wherein said combustion chamber is surrounded by said pressure chamber.

7. A hybrid gas generator for vehicle occupant restraint systems, comprising:

a housing having an outer wall;

at least one outflow opening in said outer wall for an outlet of generated gas;

at least one combustion chamber containing propellant;

at least one igniter arranged close to said propellant for igniting said propellant, said igniter comprising an ignition material;

stored compressed gas within said housing;

an expansion chamber for said generated gas developing on deflagration of said ignition material;

said expansion chamber separating said combustion chamber from said igniter;

said expansion chamber and said combustion chamber being separated from each other by a diffuser having at least one compressed gas opening which is open in the non-activated state of said gas generator;

said gas developing on deflagration of said ignition material reaching said combustion chamber via said compressed gas opening; and said diffuser having a passage opening directed and being open towards said outflow opening in a non-activated state of said gas generator so that gas generated by activation of the igniter can reach the outflow opening without flowing through the combustion chamber.

8. The gas generator according to claim 7, wherein said diffuser is constructed as a cap and is put over said igniter.

9. The gas generator according to claim 7, wherein said diffuser is radially and axially spaced from said igniter.

10. The gas generator according to claim 7, wherein said igniter has a primary and a secondary charge and also an ignition cap surrounding these charges.

11. A gas generator for vehicle occupant restraint systems, comprising:

a housing having an outer wall;

at least one outflow opening in said outer wall for an outlet of generated gas;

at least one combustion chamber containing propellant;

at least one igniter arranged close to said propellant for igniting said propellant;

said igniter comprising ignition material;

an expansion chamber for said generated gas developing on deflagration of said ignition material;

said expansion chamber separating said combustion chamber from said igniter;

said expansion chamber and said combustion chamber being separated from each other by a diffuser having at least one compressed gas opening;

said gas developing on deflagration of said ignition material reaching said combustion chamber via said compressed gas opening;

said housing having a housing base with a filling opening for said propellant, which opening is closed by a base plate;

said igniter being secured in said base plate in a pressure- and gas-tight manner;

said diffuser having an end on a base side; and an electrically non-conducting body which extends between said base plate welded to said housing base, and said end of said diffuser on said base side, and which also extends into said combustion chamber, where said non-conducting body fixes said propellant, present in tablet form, in its position.

12. The gas generator according to claim 11, wherein said combustion chamber annularly surrounds said expansion chamber.

13. The gas generator according to claim 11, wherein said igniter has a primary charge and a secondary charge and also an ignition cap surrounding these charges.

14. The gas generator according to claim 11, wherein said gas generator is a hybrid gas generator and said combustion chamber is surrounded by a pressure chamber containing compressed gas.

15. The gas generator according to claim 11, wherein a mixing chamber is provided which is separated from said combustion chamber by an intermediate base.

16. A gas generator for vehicle occupant restraint systems, comprising:

a housing having an outer wall;

at least one outflow opening in said outer wall for an outlet of generated gas;

at least one combustion chamber containing propellant;

at least one igniter arranged close to said propellant for igniting said propellant;

said igniter comprising an ignition material; and an expansion chamber surrounding said igniter for said generated gas developing on deflagration of said ignition material;

said expansion chamber separating said combustion chamber from said igniter;

said gas generator being a hybrid gas generator and said combustion chamber being surrounded by a pressure chamber containing compressed stored gas;

said gas generator further comprising a mixing chamber which is separated from the combustion chamber by an intermediate base; and said gas generator having a housing base from which a diffuser extends up to said intermediate base, said expansion chamber being open towards said combustion chamber via compressed gas openings and being open towards said mixing chamber via a separate passage opening, said passage opening being open in the non-activated state of said gas generator.

17. The gas generator according to claim 16, wherein said intermediate base separates said mixing chamber from said expansion chamber.

18. A gas generator for vehicle occupant restraint systems, comprising:

a housing having an outer wall;

at least one outflow opening in said outer wall for an outlet of generated gas;

at least one combustion chamber containing propellant;

at least one igniter arranged close to said propellant for igniting said propellant;

said igniter comprising an ignition material; and an expansion chamber surrounding said igniter for said generated gas developing on deflagration of said ignition material;

said expansion chamber separating said combustion chamber from said igniter;

said expansion chamber and said combustion chamber being separated from each other by a diffuser defining a separate part with at least one compressed gas opening;

said gas developing on deflagration of said ignition material reaching said combustion chamber via said compressed gas opening;

said gas generator being a hybrid gas generator and said combustion chamber being surrounded by a pressure chamber containing stored compressed gas;

said gas generator further comprising a mixing chamber which is separated from the combustion chamber by an intermediate base; and said diffuser being fixed in position in radial direction on said intermediate base.

19. A gas generator for vehicle occupant restraint systems, comprising:

a housing having an outer wall;

at least one outflow opening in said outer wall for an outlet of generated gas;

at least one combustion chamber containing propellant;

at least one igniter arranged close to said propellant for igniting said propellant;

said igniter comprising an ignition material; and an expansion chamber surrounding said igniter for said generated gas developing on deflagration of said ignition material;

said expansion chamber separating said combustion chamber from said igniter, said expansion chamber and said combustion chamber being separated from each other by a diffuser defining a separate part;

said gas generator being a hybrid gas generator and said combustion chamber being surrounded by a pressure chamber containing stored compressed gas;

said gas generator further comprising a mixing chamber which is separated from the combustion chamber by an intermediate base; and said gas generator having a housing base from which said diffuser extends up to said intermediate base and said diffuser having a central passage opening via which gases and particles developing on deflagration of said ignition material can move towards said outflow opening which is closed by a bursting sheet.

20. The gas generator according to claim 19, wherein a central opening in said diffuser and a passage opening in alignment therewith in said intermediate base are provided and permit a direct impact on said bursting sheet by gases and particles developing on deflagration of said ignition material.

* * * * *

UNITED STATES PATENT AND TRADEMARK OFFICE
CERTIFICATE OF CORRECTION

PATENT NO. : 6,079,740
DATED : June 27, 2000
INVENTOR(S) : Thomas Barth, Achim Hofmann, Markus Leifheit, Josef Werneth, Anja Esau It is certified that error appears in the above-indentified patent and that said Letters Patent is hereby corrected as shown below:

Column 8, line 5, change "11" to "14"

Signed and Sealed this

Twenty-second Day of May, 2001

Attest:

NICHOLAS P. GODICI

Attesting Officer    Acting Director of the United States Patent and Trademark Office